United States Patent [19]
Kiefer et al.

[11] 4,404,291
[45] Sep. 13, 1983

[54] LOW-DENSITY, OPEN-PORE MOLDED INORGANIC BODY WITH A HOMOGENEOUS PORE DISTRIBUTION

[75] Inventors: Werner Kiefer, Mainz; Maria Sura, Ingelheim, both of Fed. Rep. of Germany

[73] Assignee: Schott Glaswerke, Mainz, Fed. Rep. of Germany

[21] Appl. No.: 345,499

[22] Filed: Feb. 3, 1982

[30] Foreign Application Priority Data

Feb. 4, 1981 [DE] Fed. Rep. of Germany ....... 3103749

[51] Int. Cl.³ .............................................. B32B 5/12
[52] U.S. Cl. ........................................ 501/81; 501/82
[58] Field of Search .............................. 501/81, 82, 83

[56] References Cited

U.S. PATENT DOCUMENTS

| | | | |
|---|---|---|---|
| 2,996,389 | 8/1961 | Fernhof | 501/82 |
| 3,416,935 | 12/1968 | Einstein et al. | 501/82 |
| 3,436,444 | 4/1969 | Von Tress et al. | 501/82 |
| 3,992,216 | 11/1976 | Kirschner | 501/82 |

*Primary Examiner*—James Poer
*Attorney, Agent, or Firm*—Millen & White

[57] ABSTRACT

A novel low density molded porous sintered body contains at least 90% open pores having a specific diameter distributed equally in all directions. The material of the molded body is preferably a vitreous and/or crystalline and/or ceramic substance having a low thermal coefficient of expansion.

20 Claims, No Drawings

LOW-DENSITY, OPEN-PORE MOLDED INORGANIC BODY WITH A HOMOGENEOUS PORE DISTRIBUTION

BACKGROUND OF THE INVENTION

This invention relates to porous molded bodies having a density less than 1 g/cm³ and having pores of a predetermined size which are distributed isotropically and of which at least 90% are open. The porous bodies are formed from sintered, vitreous and/or crystalline substances.

There are abundant teachings in the prior art relating to porous and foamed molded bodies made from vitreous and/or crystalline substances. Many of these products are used for thermal insulation and as such, they have closed pores to prevent heat transfer.

Another group of products, for instance filter plates, do have open pores of a specific pore size distribution. Conversely, such products are relatively dense and do not have pores of precisely predetermined sizes.

Leached glasses with open pores or channels are also known; however, these too are of higher density.

Still further, a number of products are produced so as to yield pores having special requirements.

References detailing this prior art include the following:

J. G. Wilsmann & G. Solow "Poröses Glas," Silikattechhik 11, (1960) No. 7, pp. 348–352.

SUMMARY OF THE INVENTION

As distinguished from the prior art, an object of this invention is to provide porous, sintered, vitreous and/or crystalline materials having a density less than 1.0 g/cm³, having at least 90% of the pores of the open type, and having an isotropic distribution of the pores. Materials of this type have many uses, for example, high temperature filtration, absorption of liquids such as radioactive waste, carrier for catalytically active materials, support (core) of light-weight mirrors having a zero coefficient of thermal expansion.

Another object of this invention is to provide starting compositions for the production of such materials.

Still another object is to provide processes for the production of such materials.

Upon further study of the specification and appended claims, further objects and advantages of this invention will become apparent to those skilled in the art.

Preferred embodiments of this invention include, but are not limited to, materials wherein:

(a) more than 99% of the pores are open pores;

(b) the density of the molded body is less than 0.3 g/cm³;

(c) the porous sintered material is a conventional glass, a crystalline solder glass, a glass ceramic, or a conventional ceramic, or two or more of the aforesaid materials;

(d) all the pores are uniformly the same size;

(e) the total number of pores have two, three or more sizes with the distribution of the sizes being uniform;

(f) the materials may contain additional cavities which are at least 10 times the size of the pores;

(g) the porous sintered material is a crystallized solder glass, a glass ceramic or a conventional ceramic, and the crystalline phase in each case consists of essentially high quartz mixed crystals;

(h) the porous sintered material is comprised of substances having a glass phase and a crystalline phase, wherein the quantitative ratio between the glass phase and the crystalline phase is so selected that the molded body has a coefficient of linear thermal expansion $\alpha_{20-300}$ less than $1 \times 10^{-6} K^{-1}$, preferably $\alpha_{20-100}$ of $0 \pm 0.1 \times 10^{-6} K^{-1}$.

DETAILED DISCUSSION

The invention applies to vitreous and/or crystalline products of densities of less than 1 g/cm³ of which at least 90% and preferably more than 99% of the pores are open. The term "open pores" means that the pores communicate with each other and with the ambient atmosphere. Such products, for instance, can be subjected to a vacuum without resulting in a change in dimensions.

A further feature of the molded product of the invention is that the pores are of a specific diameter and are distributed isotropically.

The term "isotropic pore distribution" means that the pore distribution is equal in all directions. This signifies that the molded products have the same properties, such as strength, in all directions. The pore diameter can be the same, for instance 2 or 4 mm, throughout the entire body; alternatively, the molded body may also contain pores of two predetermined diameters, for instance 2 and 4 mm. The ratio of the smaller to the larger pores also may be different, for instance it might be 20% of 2 mm pores and 80% of 4 mm pores. As a rule this ratio is the same throughout the molded body.

If desired, however, a specific transition pattern may exist within the body, for example there may be a layer of 5 mm pores at the lowest part of the body, thereupon a layer having mixed 3 mm pores and 5 mm pores, thereupon a layer of 3 mm pores, and on top a layer of 1 mm pores.

Also, it is not inconsistent with the requirement of isotropic pore distribution if the porous molded body with its isotropically distributed pores is deliberately made to comprise additionally substantial cavities (for instance larger than the pores by a factor of 10) at predetermined sites. For instance, essentially in the middle of a body of 5 mm pores there may be one cavity of 50 mm diameter.

The preferred size of the isotropically distributed pores is 1 mm to 5 mm.

Another feature of the product of the invention is its low density of less than 1 g/cm³. Because the strength of such porous molded bodies is highly dependent on the density, a compromise must be found between these two values depending on the field of application. Because of the very good pore distribution, bodies with densities of less than 0.5 g/cm³ exhibit adequate strength with respect to handling. As regards special applications, for instance as support material for astronomical mirrors to be launched into space, densities of less than 0.3 g/cm³ are needed. The minimum density is generally at least 0.2 g/cm³, preferably at least 0.25 g/cm³.

The new molded body comprises a sintered, vitreous and/or crystalline substance; accordingly, it may be a conventional glass, a crystallized solder glass, a glass ceramic, a conventional ceramic substance or a mixture of these substances.

Porous molded bodies made of sintered conventional glass essentially evince the physical and chemical properties of the initial glass. However, it is possible that glasses tending to segregation, phase separation be present in the separated states and to exhibit the properties of the dissociated initial glass. By a "conventional glass", is intended to include borosilicate glass, alumosilicate glass, soda lime silicate glass etc.

The porous molded body can also be comprised of glass ceramics, preferably of glass ceramics containing high quartz mixed solid solutions. The properties of these bodies are determined by the amount and composition of the residual glass phase and crystal phase of the glass ceramics. Molded bodies made of glass ceramics with high quartz solid solutions can exhibit linear thermal expansions $\alpha$ of less than $1 \times 10^{-6} K^{-1}$. By "glass ceramics", is intended to include "Zerodur," "Robax" and "Ceran" (trade names owned by Schott Glaswerke, Mainz), all these glass ceramis being used here without nucleating agents.

In lieu of glass ceramics, the porous molded body can be comprised of crystallized solder glass. A crystallizing solder glass retains its glassy character up to the soldering temperature and at this temperature precipitates crystals. Preferably the molded body consists of a crystallized solder glass containing predominantly high quartz mixed crystals as the crystalline phase. In these molded bodies, the properties are determined by the amount and the composition of the residual glass phase and of the crystalline phase of the crystallized solder glass. Again, values of $\alpha$ less than $1 \times 10^{-6}/K$ can be obtained. By "crystallized solder glass" is intended to include solder glass type 8593 sold by Schott Glaswerke Mainz.

Porous molded bodies made of conventional ceramic substances, for instance from natural eucryptite, preferably also contain a slight, e.g., 5 to 25 weight percent, glass proportion or crystallized solder glass proportion, whereby the strength of the molded body is increased. By "conventional ceramic" is intended to include natural raw materials used in the production of ceramics, such as:

natural spodumen,
natural eucryptite,
natural petalite,
natural cordierite, or powders made from ceramics of the types mentioned above.

The invention also covers porous molded bodies comprising a mixture of several substances from the group of glasses, crystallized solder glass, glass ceramics and ceramic substances.

Illustratively, molded bodies made from glass ceramics and crystallized solder glass or from glass ceramics and glass of low thermal expansion exhibit thermal expansion coefficients of $0 \pm 0.1 \times 10^{-6}/K$. In these molded bodies, the glass ceramics and the crystallizing solder glasses contain high quartz (German—Hochquarz) mixed crystals. The crystallized glass solder or the glass which are present in smaller amounts of not more than 25% cause the cohesion of the glass ceramic particles. This is important because the sintering process for the manufacture of these molded bodies having low thermal expansions must take place at less than 900° C.

The thickness of the molded body of this invention can vary widely depending on the intended field of utility. For example, the thickness may be from 5 mm to 300 mm, preferably 50 mm to 150 mm.

The overall shape of the molded products may also vary depending on the field of applications, e.g., flat or curved sheets.

The products of the invention that consist essentially of vitreous and/or crystalline substances of a density of less than 1 $g/cm^3$ for more than 90% of open pores of predetermined size and of isotropic distribution, can be prepared by the following process:

A finely-ground, sintering powder is mixed with organic substances while a liquid is added, placed into a mold, predried and annealed.

The pre-drying takes place at room temperature. After the pre-drying, the mold can be removed. The preformed body is heated at least in two stages. In the first annealing stage, the combustion of the organic substance and thereby the formation of the open pores takes place. In the second stage the powder sinters together. The sintering temperature is so selected that the pores remain open during the sintering process. The sintering powder comprises glass, easily crystallizing glass, easily crystallizing glass with nucleating agents, crystallized glass ceramics, crystalline sintering products or mixtures of these substances. The powder generally has a particle size of less than 200 $\mu m$, preferably of less than 60 $\mu m$ or, even better, of less than 20 $\mu m$. (However, the particle size of the powder is not too critical.)

Porous glass is the easiest to produce by this process.

When using powders made from easily crystallizing glass or easily crystallizing glass with nucleating agents, the sintering process competes with the crystallization process. For an otherwise equal composition and the same rate of heating, glasses with nucleating agents crystallize earlier than glasses without then. The difference, however, becomes less as the heating slows. Both kinds of glass sinter better the more rapid the heating procedure. The heating rate however is limited because on the one hand the organic substance must burn to completion and on the other hand shrinkage takes place during the crystallization which will be the higher the more rapid the heating and the larger the dimensions of the foam body.

The problem of shrinkage does not occur in powders made from crystallized glass ceramics or from the crystalline products where there is absence of structural changes such as those caused by recrystallization and discharge of water of crystallization during heating and sintering. The sintering temperatures of the crystalline products are rather high in that respect, mostly above 900° C.

The production of porous glass ceramics of low, preferably zero thermal expansion, requires the use of glass ceramics having high quartz mixed crystals. As the transformation from the high quartz mixed crystal into spodumene begins above 800° C., the sintering temperature in this case must be less than 850° C., preferably less than 800° C. Experiment has shown that hardly any sintering takes place for crystallized glass ceramics of approximately zero thermal expansion during annealing and that accordingly only relatively port mechanical strengths at low densities can be obtained below 850° C.

These difficulties can be circumvented by adding a given proportion of conventional glass powder to the crystalline powder. The admixed glass powder is meant to establish the bond between the crystalline parts or particles. The mechanical strength of the porous bodies depends on the proportion of conventional glass powder, on the particle size of the conventional glass powder and on the adaptation of the conventional glass powder to the crystalline powder as regards thermal expansion.

As regards porous glass ceramics of low thermal expansion, the proportion of glass powder must be kept as low as possible because the thermal expansion of the glass powder in this instance is higher than that of the crystalline powder. The thermal expansion of the porous glass ceramics is approximately an additive result from the individual components. To compensate for the positive thermal expansion of the glass powder, part of the crystalline powder therefore must exhibit a negative thermal expansion. The crystalline powder with negative thermal expansion may be comprised of a glass ceramic or of a mineral such as eucryptite.

In lieu of glass powder, or solder glass, crystallizing solder glass can also be used. The crystallizing solder glass offers the advantage of providing a bond between the crystalline particles at a relatively low temperature and, after it has crystallized itself, of exhibiting a low thermal expansion. Due to the low thermal expansion of the crystallizing solder glass, the proportion of said powder and hence the mechanical strength of resultant porous glass ceramics can be increased.

Irrespective of the type of binding glass, its proportion in the mixture may be, for example, 20–50% borosilicate glass of less than 20 μm particle size, or 5–30% Schott solder glass 8462 of about the same particle size as the main ingredient of the mixture.

One of the advantages offered by the process is that the pore size and the pore distribution can be very accurately predetermined. As mentioned already, the desired pores and cavities are generated by the combustion of organic substances which are mixed into the sintering powder in the form of discrete organic bodies. The size of the organic bodies, preferably balls of a foamed plastic, determines the pore size. Accordingly, it is possible to produce equally large pores or pores of different sizes at a predetermined ratio.

In the invention, densities of 1 g/cm$^3$, preferably not more than 0.5 g/cm$^3$, especially not more than 0.3 g/cm$^3$, can be fairly accurately adjusted by means of the ratio of the weight of the sintering powder to the volume of the foamed plastic.

The advantage of the expanded plastic is that only a relatively small amount of organic substance is required to produce the pores. It is important as regards obtaining high mechanical strength that the organic ingredients be burned as completely as possible during the heating and sintering processes. The combustion gases of the organic substance produce the open pores. Therefore, the sintering process may not take place at temperatures for which the pores will be closed again during the sintering.

There are essentially two purposes for the liquid which is added: on the one hand, it should assure a uniform distribution of the sintering powder and the organic substance relative to one another, and on the other hand, it should accelerate the complete combustion of the organic substance. Pure water was found to be unsatisfactory as a liquid, because the sintering powder settles too easily. On the other hand, the addition of those liquids which have both a hydrophilic and a hydrophobic group was found advantageous, for instance glycerine. Such liquids not only improve the adhesion of the powder to the organic substance, for instance foamed plastic, but also substantially increase the lubrication during mixing and kneading. Small amounts of sulfuric acid and ammonium sulfate $(NH_4)_2SO_4$ also affect the adhesion and lubrication favorably.

Experiment has shown that by adding $H_2O_2$ to the liquid, the organic substance will be burned off more rapidly and more completely. In this process, the catalysts releasing the oxygen of the $H_2O_2$ act in accelerating manner. A suitable catalyst was found to be for instance $MnO_2$ in amounts of less than 0.2% by weight.

The density and the strength of the porous bodies also depends on the grain size of the sintering powder. The particle size should be less than 200 microns. For densities less than 0.5 g/cm$^3$, the grain size preferably should be less than 20 microns. If for improved sintering or soldering, solder glass or crystallizing solder glass is added to the crystalline powder, then the particle size shall be less than 20 microns and preferably less than 5 microns.

For purposes of illustration, the following ranges of ingredients are preferred in the composition to be molded.

| Component | % by weight |
|---|---|
| Conventional glass, glass ceramic or conventional ceramic | 50–95 |
| Bonding glass (solder glass) | 5–50 |
| Glycerine or equivalent | 5–10 |
| Hydrogen peroxide | 5–15 |
| Manganese dioxide | 0.05–0.1 |
| Ammonium sulfate | 3–8 |
| Sulfuric acid | 3–8 |
| Foamed plastic balls | 2–10 |
| Water | 10–30 |

In order to obtain as homogeneous a mixture as possible, the sintering powder with any additions such as solder glass and $(NH_4)_2SO_4$ is first thoroughly mixed. Then the sintering powder is mixed with the organic substance, for instance foamed plastic, while the liquid is slowly added. The homogeneous material is next placed into a mold for instance made of ceramic. In order to prevent formation of any small gaps, the material is firmly tamped in.

Depending on the size of the sintered body, the material must be kept for a fairly long time at room temperature so that the added water can slowly evaporate. It was found advantageous to cover the surface with a glycerine-soaked cloth. After pre-drying at room temperature, the outer mold already can be removed.

The heating then takes place for at least two hours.

The burning off of the organic substance and thereby the formation of the open pores, preferably at 120° to 450° C. within about 120 to 180 minutes, takes place in the first stage.

Nucleation may take place in the second stage as regards vitreous glass ceramics or crystallizing solder glasses, preferably at 600° to 700° C. within about 30 to 90 minutes.

The third heating stage, at 600° to 900° C. and for 200 to 900 minutes, is for the purpose of sintering while retaining the open pores and the outer mold.

The crystallization of a vitreous glass ceramic or of a crystallizing solder glass should take place during sintering or thereupon. If crystallization takes place earlier there is the risk of cracks appearing in the sintered body.

The rate of heating depends both on the size of the porous body and on the kind of the sintering powder used. No unduly large temperature difference may arise within the porous body during the heating process. Especially during the sintering this temperature difference should be as small as possible.

When using glass powder or when adding glass powder or solder glass to crystalline powders, the heating may take place very slowly. On ther other hand, the use of easily crystallizing glass powders or of easily crystallizing glass powders with nucleating agents requires a given heating rate below which one may not operate. This heating rate indirectly also predetermines the size of the porous body on account of the admissible temperature difference taking place in the porous body during the heating. When crystallizing solder glass is used, the tempering program (nucleation and crystallization) of this crystallizing glass solder must be observed.

The advantages obtained in the above described production of the porous glass, porous glass ceramics and porous ceramic sintering substances are that one obtains simultaneously low densities and open pores. In addition, one obtains a uniform pore distribution with precisely determined pore diameters. The process is quite flexible as regards the properties to be achieved and the structure of the porous bodies. Thus, when using a suitable, sintering powder, it is possible to produce porous glass ceramics of which the linear thermal expansions are about zero.

For obtaining a sintered porous body of a certain shape the mixture of sintering powder, organic matter and liquid is given in a mold of the desired shape, and is dried therein. Slight pressure of 1 to 10 g/cm$^2$ could be applied at this stage. Thereafter the body is taken out of the mold, and is annealed.

Without further elaboration, it is believed that one skilled in the art can, using the preceding description, utilize the present invention to its fullest extent. The following preferred specific embodiments are, therefore, to be construed as merely illustrative, and not limitative of the remainder of the disclosure in any way whatsoever. In the following examples, all temperatures are set forth uncorrected in degrees Celsius; unless otherwise indicated, all parts and percentages are by weight.

EXAMPLE 1

135 g of Zerodur powder with a grain size less than 60 microns, 15 g of Duran powder with a grain size less than 20 microns and 10 g of ammonium sulfate are mixed in a mixer; (Zerodur is a commercial glass ceramic with a liner thermal expansion of about zero; Duran is the known borosilicate glass for lab glassware). This sintering powder is mixed and kneaded with 10 g of Styropor P 401 (polystyrene) (foamed) balls of a diameter of 1.5 mm, as the organic substance, while 44 ml of liquid are being added. The liquid consists of 12 ml of (30%) perhydrol, 12 ml of (87%) glycerine, and 20 ml of water. The kneaded material is placed into a mold and dried for 20 h at 75° C. After drying, the mold is removed and the body is heated at 2 K/min to 850° C. and left for 2 h at this temperature before being cooled again.

The glass ceramic body evinces a wholly uniform pore distribution and a density of 0.32 g/cm$^3$, a modulus of elasticity of 340 N/mm$^2$, a compressive strength of 0.24 N/mm$^2$, and an open-pore proportion in excess of 90%.

A second sample with 540 g of Zerodur of a grain size less than 20 microns, of 60 g of Duran of a grain size less than 20 microns, 40 g of $(NH_4)SO_4$, 60 ml of $H_2O_2$ (30%), 75 ml of glycerine (87%), 150 ml of $H_2O$ and 50 g of Styropor P 401 was mixed, dried and tempered as the first sample.

The density of this sample was 0.25 g/cm$^3$, the modulus of elasticity was 230 N/mm$^2$, the compressive strength was 0.23 N/mm$^2$ and the open-pore proportion was in excess of 99%.

The finer grain size of Zerodur made it possible to lower the density from 0.32 to 0.25 g/cm$^3$ without substantially affecting the compressive strength.

EXAMPLE 2

Table 1 lists examples for various sintering powders. The composition of lubricant, oxidizer, organic substance and liquid remains constant. A porous open-pore glass is prepared from the Duran glass powder with a grain size less than 60 microns in #1. #2, 3, 4 and 5 result in porous glass ceramics. The powder from crystallized glass ceramics cannot be sintered at temperatures less than 850° C. and therefore requires as an additive glass powder (#2), solder glass or crystallizing solder glass.

Using a sintering powder of a glass ceramic (Zerodur) not yet ceramized (#3), it is possible to make small porous glass ceramic bodies by heating rapidly. This also applies to a sintering powder that tends to easily crystallize at the surface. Such a powder for instance is a glass powder of the Zerodur composition but without the nucleating agents $TiO_2$ and $ZrO_2$ (#4).

To adjust the thermal expansion, a glass ceramic or a mineral (eucryptite) of negative thermal expansion can be added to the sintering powder (#5). Just as the ceramized glass ceramic, eucryptite cannot be sintered together at temperatures less than 850° C. (#6). By adding glass powder, solder glass or crystallizing solder glass, porous sintering substances can be prepared from minerals (#7).

EXAMPLE 3

Table 2 shows the effect of various lubrication and oxidation additives. The mixture, drying and annealing are as described in Example 1. In the absence of the oxidizers, the organic substance (Styropor P 401) burned only incompletely. The layers with residues of inorganic substance crumble easily.

EXAMPLE 4

The effect of the organic substance (Styropor) is shown in Table 3. The size of the plastic balls only slightly affects the density (#1,2,3). The least density was achieved with the P 401 value (#2). By mixing various ball sizes (#4,5 and 8) it is possible to slightly lower the density.

The density however is strongly dependent on the added amount of plastic (#2, 6 and 7).

TABLE 1

Sintering powder composition (grain size less than 60 microns)

| Lfd. Nr. # | Composition — Sintering powder | Composition — Lubricant, oxidizer, organic pore-forming substances | | Tempering Program | Density ($g/cm^3$) | Compressive Strength ($N/mm^2$) | Modulus of elasticity ($N/mm^2$) | $\alpha_{100} \times 10^7$ ($K^{-1}$) |
|---|---|---|---|---|---|---|---|---|
| 1 | 100% Duran 50 | 7 g<br>8 g<br>10.0 g<br>0.01 g<br>20–30 g<br>4.8 g | Ammonium sulfate<br>Glycerine (87%)<br>Perhydrol (30%)<br>$MnO_2$<br>Water<br>Styropor P 401 (BASF), doubly foamed | 100° C. $\xrightarrow{0.5-10°\ C./''}$ 770° C. 1h | 0.33 | n.b. | n.b. | n.b. |
| 2 | 90% Zerodur+<br>10% Duran 50 | 7 g<br>8 g<br>10.0 g<br>0.01 g<br>20–30 g<br>4.8 g | Ammonium sulfate<br>Glycerine (87%)<br>Perhydrol (30%)<br>$MnO_2$<br>Water<br>Styropor P 401 (BASF), doubly foamed | 100° C. $\xrightarrow{0.5-10°\ C./''}$ 850° C. 2h | 0.26 | 0.24 (tensile strength per PE method 0.58) | 250 | 3–5 |
| 3 | 100% Zerodur not ceramized | 7 g<br>8 g<br>10.0 g<br>0.01 g<br>20–30 g<br>4.8 g | Ammonium sulfate<br>Glycerine (87%)<br>Perhydrol (30%)<br>$MnO_2$<br>Water<br>Styropor P 401 (BASF), doubly foamed | 100° C. $\xrightarrow{10-20°\ C./''}$ 850° C. 2h | 0.35 | 0.5 | n.b. | n.b. |
| 4 | 100% Zerodur no nucleating agents-not ceramized | 7 g<br>8 g<br>10.0 g<br>0.01 g<br>20–30 g<br>4.8 g | Ammonium sulfate<br>Glycerine (87%)<br>Perhydrol (30%)<br>$MnO_2$<br>Water<br>Styropor P 401 (BASF), doubly foamed | 100° C. $\xrightarrow{10-20°\ C./''}$ 850° C. 2h | 0.34 | 2–8 | 700 | n.b. ($\alpha_{300}=0.2\times10^{-7}$ at 800° C. 24h) |
| 5 | 88% Zerodur<br>2% Eucryptite<br>10% Duran 50 | 7 g<br>8 g<br>10.0 g<br>0.01 g<br>20–30 g<br>4.8 g | Ammonium sulfate<br>Glycerine (87%)<br>Perhydrol (30%)<br>$MnO_2$<br>Water<br>Styropor P 401 (BASF), doubly foamed | 100° C. $\xrightarrow{0.5-10°\ C./''}$ 850° C. 2h | 0.27 | 0.30 | n.b. | n.b. |
| 6 | 100% Eucryptite | 7 g<br>8 g<br>10.0 g<br>0.01 g<br>20–30 g<br>4.8 g | Ammonium sulfate<br>Glycerine (87%)<br>Perhydrol (30%)<br>$MnO_2$<br>Water<br>Styropor P 401 (BASF), doubly foamed | 100° C. $\xrightarrow{10-20°\ C./''}$ 990° C. 2h | 0.25 | hardly measurable | n.b. | n.b. |
| 7 | 80% Eukryptite<br>20% Duran 50 | 7 g<br>8 g<br>10.0 g<br>0.01 g<br>20–30 g<br>4.8 g | Ammonium sulfate<br>Glycerine (87%)<br>Perhydrol (30%)<br>$MnO_2$<br>Water<br>Styropor P 401 (BASF), doubly foamed | 100° C. $\xrightarrow{0.5-10°\ C./''}$ 850° C. 2h | 0.23 | 0.1 | n.b. | n.b. |
| 8 | 80% Zerodur+<br>20% Cryst. solder glass | 7 g<br>8 g<br>10.0 g<br>0.01 g<br>20–30 g<br>4.8 g | Ammonium sulfate<br>Glycerine (87%)<br>Perhydrol (30%)<br>$MnO_2$<br>Water<br>Styropor P 401 (BASF), doubly foamed | 100° C. $\xrightarrow{0.5-10°\ C./''}$ 850° C. 2h | 0.23++ | 0.38++ | 234++ | +2.0 |

TABLE 1-continued

Sintering powder composition (grain size less than 60 microns)

| Lfd. Nr. # | Composition Sintering powder | Lubricant, oxidizer, organic pore-forming substances | | Tempering Program | Density (g/cm³) | Compressive Strength (N/mm²) | Modulus of elasticity (N/mm²) | $\alpha_{100} \times 10^7$ (K$^{-1}$) |
|---|---|---|---|---|---|---|---|---|
| 9 | 80% Zerodur+ 20% Cryst. solder glass | 7 g 8 g 10.0 g 0.01 g 20-30 g 4.8 g | Ammonium sulfate Glycerine (87%) Perhydrol (30%) MnO₂ Water Styropor P 401 (BASF), doubly foamed | 100° C. $\xrightarrow{0.25° C./'}$ 850° C. 2h | 0.21 | 0.13 | 164 | +15.5 |

+ the proportion of open pores is 99.8%
++ the isotropy of the properties is shown in Table 1a
"n.b." means not determined (because the sample was too small)

TABLE 1a

Properties of the composition 8 in three directions

| | | Measured values | | |
|---|---|---|---|---|
| Sample | Direction | Density (g/cm³) | Modulus of Elasticity (N/mm²) | Compressive Strength (N/mm²) |
| 1 | x | 0.24 | 230 | 0.44 |
| | y | 0.24 | 224 | 0.42 |
| | z | 0.24 | 201 | 0.39 |
| 2 | x | 0.26 | 323 | 0.56 |
| | y | 0.26 | 353 | 0.65 |
| | z | 0.26 | 363 | 0.55 |
| 3 | x | 0.21 | 311 | 0.50 |
| | y | 0.21 | 329 | 0.50 |
| | z | 0.21 | 300 | 0.50 |

The fluctuations of the measured values are within the precision of the measurements.

TABLE 2

Effects of different lubricant and oxidizer additions

| | | Lubricant, oxidizer | | | | | | | Properties | |
|---|---|---|---|---|---|---|---|---|---|---|
| Lfd. Nr. # | Sintering powder wt. % | Glycerine (87%) ml/100 g | Sugar g/100 g | Ammonium Sulfate g/100 g | Manganese Dioxide g/100 g | Perhydrol (30%) ml/100 g | Water ml/100 g | Organic Substance g/100 g | Density (g/cm³) | Compressive strength (N/mm²) | |
| 1 | 80% Zerodur 20% Duran | — | — | 7 | 0.01 | 10 | ~30 | 8 | 0.25 | 0.33 | |
| 2 | 80% Zerodur 20% Duran | 10 | — | 7 | 0.01 | 10 | ~30 | 8 | 0.27 | 0.30 | |
| 3 | 80% Zerodur 20% Duran | — | 5 | 7 | 0.01 | 10 | ~30 | 8 | 0.23 | 0.21 | tends to crack formation |
| 4 | 80% Zerodur 20% Duran | 10 | — | — | 0.01 | 10 | ~30 | 8 | 0.25 | 0.10 | tends to layer formation and crumbles |
| 5 | 80% Zerodur 20% Duran | 10 | — | 7 | — | 10 | ~30 | 8 | 0.27 | 0.10 | tends to layer formation not all the pores are open |
| 6 | 80% Zerodur 20% Duran | 10 | — | 7 | — | — | ~30 | 8 | 0.28 | x | tends to layer formation not all the pores are open |
| 7 | 80% Zerodur 20% Duran | 10 | — | 7 | 0.01 | — | ~30 | 8 | 0.28 | x | communication between pores, incomplete combustion of organic substance |
| 8 | 80% Zerodur 20% Duran | — | — | — | — | — | 40 | 8 | 0.37 | x | powder deposits in ca. 1 cm layer, many pores are closed | x = no uniform strength; films with residues of organic substance crumble easily.

TABLE 3

Effect of the organic substances (Styropor)

| Lfd. Nr. # | Sintering powder weight % | Lubricant, oxidizer g/100 g Powder | Organic substance (ball size$^x$) g/100 g Powder-ball size | Properties | |
|---|---|---|---|---|---|
| 1 | 90% Zerodur 10% Duran | 7 g Ammonium sulfate 8 g Glycerine (87%) | 5 g P 501 | Density: Compressive strength: | 0.31 g/cm² 0.30 N/mm² |

TABLE 3-continued

Effect of the organic substances (Styropor)

| Lfd. Nr. # | Sintering powder weight % | Lubricant, oxidizer g/100 g Powder | Organic substance (ball size[x]) g/100 g Powder-ball size | Properties | |
|---|---|---|---|---|---|
| 2 | 90% Zerodur 10% Duran | 10 g Perhydrol (30%) 0.01 g Manganese dioxide 20–30 g Water 7 g Ammonium sulfate 8 g Glycerine (87%) | 5 g P 401 | Density: Compressive strength: | 0.28 g/cm$^3$ 0.30 N/mm$^2$ |
| 3 | 90% Zerodur 10% Duran | 10 g Perhydrol (30%) 0.01 g Manganese dioxide 20–30 g Water 7 g Ammonium sulfate 8 g Glycerine (87%) | 5 g P 301 | Density: | 0.30 g/cm$^3$ |
| 4 | 90% Zerodur 10% Duran | 10 g Perhydrol (30%) 0.01 g Manganese dioxide 20–30 g Water 7 g Ammonium sulfate 8 g Glycerine (87%) | 2.5 g P 501 2.5 g P 301 | Density: | 0.28 g/cm$^3$ |
| 5 | 90% Zerodur 10% Duran | 10 g Perhydrol (30%) 0.01 g Manganese dioxide 20–30 g Water 7 g Ammonium sulfate 8 g Glycerine (87%) | 4 g P 401 1 g P 301 | Density: Compressive strength: | 0.26 g/cm$^3$ 0.24 N/mm$^2$ |
| 6 | 90% Zerodur 10% Duran | 10 g Perhydrol (30%) 0.01 g Manganese dioxide 20–30 g Water 7 g Ammonium sulfate 8 g Glycerine (87%) | 7 g P 401 | Density: | 0.24 g/cm$^3$ |
| 7 | 90% Zerodur 10% Duran | 10 g Perhydrol (30%) 0.01 g Manganese dioxide 20–30 g Water 7 g Ammonium sulfate 8 g Glycerine (87%) | 3 g P 401 | Density: | 0.42 g/cm$^3$ |
| 8 | 90% Zerodur 10% Duran | 10 g Perhydrol (30%) 0.01 g Manganese dioxide 20–30 g Water 7 g Ammonium sulfate 8 g Glycerine (87%) 10 g Perhydrol (30%) 0.01 g Manganese dioxide 20–30 g Water | 6 g P 401 1 g P 301 | Density: | 0.22 g/cm$^3$ |

$x$ = P 501 - ball size after foaming, diameter from 0.4 to 1.5 mm
 = P 401 - ball size after foaming, diameter from 1.5 to 2.0 mm
 = P 301 - ball size after foaming, diameter from 2.0 to 3.0 mm The preceding examples can be repeated with similar success by substituting the generically or specifically described reactants and/or operating conditions of this invention for those used in the preceding examples.

From the foregoing description, one skilled in the art can easily ascertain the essential characteristics of this invention, and without departing from the spirit and scope thereof, can make various changes and modifications of the invention to adapt it to various usages and conditions.

What is claimed is:

1. A molded sintered porous body comprising at least one of: a conventional glass, a solder glass or a crystallized solder glass, said body having more than 90% of the pores therein of the open-type, said pores being isotropically distributed, and said body having a density of less than 1.0 g/cm$^3$.

2. A molded body according to claim 1, wherein more than 99% of the pores are open pores.

3. A molded body according to claim 1, wherein the density of the molded body is less than 0.3 g/cm$^3$.

4. A molded body according to claim 1, wherein the porous sintered material comprises 20–50% by weight of borosilicate glass or 5–30% solder glass.

5. A molded body according to claim 1, wherein the porous sintered material comprises a crystallized solder glass, and at least one of a glass ceramic and a ceramic.

6. A molded body according to claim 1, wherein the porous sintered material comprises at least two of the following: a conventional glass, crystallized solder glass, glass ceramic and ceramic substance.

7. A molded body according to claim 1, wherein all pores are uniformly the same size.

8. A molded body according to claim 1, wherein the total number of pores consists essentially of uniformly distributed pores of at least two sizes.

9. A molded body according to claim 1, wherein the molded body comprises additional cavities which are at least 10 times larger than the pores.

10. A molded body according to claim 5, wherein the crystalline phase of the crystallized solder glass, of the glass ceramic and of the ceramic substance consists essentially of high-quartz mixed crystals.

11. A molded body according to claim 6, wherein the quantitative ratio between the glass phase and the crystal phase and their composition are so selected that the molded body exhibits a linear thermal expansion coefficient $\alpha_{20-300}$ of less than $1 \times 10^{-6}$/K.

12. A molded body according to claim 11, wherein the molded body exhibits a linear thermal expansion coefficient $\alpha_{20-100}$ of $0 \pm 0.1 \times 10^{-6}$/K.

13. A process for producing a molded sintered porous body according to claim 1, said process comprising providing said at least one of: a conventional glass, a solder glass, or a crystallizing solder glass, in powder form; admixing to said powder an organic combustible substance; annealing resultant admixture to a temperature sufficient to burn off said organic substance to form open pores in the resultant mass; further heating the resultant mass at a temperature and for a sufficient time such that the powder sinters together and the pores remain open during the sintering process.

14. A process according to claim 1, wherein said powder has a particle size of less than 200 microns, and the organic substance comprises foamed plastic balls.

15. A process according to claim 13, said powder being a crystallizing solder glass.

16. A molded sintered body according to claim 1, consisting essentially of a ceramic and 5–25% by weight in total of a conventional glass and/or crystallized solder glass.

17. A molded sintered body according to claim 1, consisting essentially of a glass ceramic and a conventional glass.

18. A molded sintered body according to claim 1, consisting essentially of a glass ceramic and a crystallizing solder glass.

19. A molded body according to claim 5, wherein the quantitative ratio between the glass phase and the crystal phase and their composition are so selected that the molded body exhibits a linear thermal expansion coefficient $\alpha_{20\text{-}300}$ of less than $1 \times 10^{-6}/K$.

20. A molded body according to claim 16, wherein the quantitative ratio between the glass phase and the crystal phase and their composition are so selected that the molded body exhibits a linear thermal expansion coefficient $\alpha_{20\text{-}300}$ of less than $1 \times 10^{-6}/K$.

* * * * *